United States Patent
Depompeo

(10) Patent No.: US 11,345,112 B2
(45) Date of Patent: May 31, 2022

(54) THERMAL SLEEVE WITH REFLECTIVE POSITIONING MEMBER, ASSEMBLY THEREWITH AND METHOD OF CONSTRUCTION THEREOF

(71) Applicant: FEDERAL-MOGUL POWERTRAIN LLC, Southfield, MI (US)

(72) Inventor: Nicholas Depompeo, Avondale, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 17/023,177

(22) Filed: Sep. 16, 2020

(65) Prior Publication Data

US 2021/0001587 A1     Jan. 7, 2021

Related U.S. Application Data

(62) Division of application No. 15/227,210, filed on Aug. 3, 2016, now Pat. No. 10,807,341.

(Continued)

(51) Int. Cl.
*B60R 16/02*     (2006.01)
*H01B 7/29*      (2006.01)
(Continued)

(52) U.S. Cl.
CPC ............ *B32B 1/08* (2013.01); *B60R 16/0215* (2013.01); *H01B 7/00* (2013.01); *H01B 7/0045* (2013.01);
(Continued)

(58) Field of Classification Search
CPC .... B32B 1/08; B60R 16/0215; H05K 5/0213; H02G 3/04; H02G 3/0412; H01B 7/00; H01B 7/0045; H01B 7/29; H01B 7/292; H01B 7/295; H01B 13/245; H01B 17/58; H01B 17/60; H01B 17/62; H01B 17/66
See application file for complete search history.

(56) References Cited

U.S. PATENT DOCUMENTS

| 6,254,145 B1 | 7/2001 | Schwarz et al. | |
| 2007/0191755 A1* | 8/2007 | Sellis | F16L 57/04 |
| | | | 604/15 |
| 2007/0206914 A1 | 9/2007 | Tapper | |

FOREIGN PATENT DOCUMENTS

| CN | 1249806 A | 4/2000 |
| CN | 2842829 Y | 11/2006 |
| CN | 1961466 A | 5/2007 |

* cited by examiner

*Primary Examiner* — Walter Aughenbaugh
(74) *Attorney, Agent, or Firm* — Robert L. Stearns; Dickinson Wright, PLLC

(57) ABSTRACT

A thermal sleeve for protecting an electronic member connected to a wiring harness against exposure to heat, combination thereof, and method of construction thereof is provided. The thermal sleeve has a tubular member including a circumferentially continuous wall with an insulative inner layer bounding an inner cavity extending along a central longitudinal axis between open opposite ends and a reflective outer layer. The sleeve further includes a positioning member constructed of resilient, reflective metal material. The positioning member has a tubular portion and at least one resilient finger extending radially inwardly from the tubular portion for abutment with the wiring harness. The tubular portion is fixedly attached to one of the opposite ends of the wall of the tubular member.

5 Claims, 3 Drawing Sheets

Related U.S. Application Data

(60) Provisional application No. 62/200,735, filed on Aug. 4, 2015.

(51) Int. Cl.
*B32B 1/08* (2006.01)
*H01B 17/60* (2006.01)
*H01B 7/00* (2006.01)
*H01B 17/58* (2006.01)
*H01B 7/295* (2006.01)
*H05K 5/02* (2006.01)

(52) U.S. Cl.
CPC ............ *H01B 7/292* (2013.01); *H01B 7/295* (2013.01); *H01B 17/58* (2013.01); *H01B 17/60* (2013.01); *H05K 5/0213* (2013.01)

THERMAL SLEEVE WITH REFLECTIVE POSITIONING MEMBER, ASSEMBLY THEREWITH AND METHOD OF CONSTRUCTION THEREOF

CROSS-REFERENCE TO RELATED APPLICATION

This application claims the benefit of U.S. Utility application Ser. No. 15/227,210, filed Aug. 3, 2016, and U.S. Provisional Application Ser. No. 62/200,735, filed Aug. 4, 2015, both of which are incorporated herein by reference in their entirety.

BACKGROUND OF THE INVENTION

1. Technical Field

This invention relates generally to tubular sleeve assemblies that provide thermal protection to an electronic object contained therein, and more particularly to a tubular sleeve assembly including a positioning member to maintain the assembly in a selectively releasable, fixed position about the electronic object contained therein.

2. Related Art

Sensors used in automotive applications, such as oxygen sensors which provide data to control engine operation and performance, are often mounted within the engine compartment of a vehicle where they are subject to harsh environmental elements including intense radiant heat and sources of abrasion and vibration during vehicle operation. Due to the harsh environmental elements, it is advantageous, and in many cases a requirement, to cover the relatively delicate, temperature sensitive sensors with a protective sleeve in an effort to dampen vibration, provide protection against abrasion and shield radiant heat from reaching the sensor. Such sleeves generally comprise an elongated, cylindrical tube extending between opposite, open free ends. The cylindrical tube generally includes a damping inner layer, such as of a nonwoven material, for example, polyester felt and a reflective outer layer comprising, for example, an aluminum foil layer laminated to an outer surface of the inner layer.

Due to the configuration of the protective cylindrical sleeve and its harsh environment, it is typically difficult to assemble the sleeve about the sensor in a manner which allows the sleeve to be reliably secured and maintained in a desired position, while at the same time providing a mechanism in which to readily remove the sleeve for servicing of the sensor. Adhesives, tape and interference fits of the entirety of an inner surface of the cylindrical wall of the sleeve are used to effect attachment, but each of these mechanisms suffer various disadvantages. Adhesive attachment of the sleeve about the sensor, while generally secure, at least initially, permanently attaches the sleeve to the sensor, and thus, complicates servicing the sensor at a future time, and in addition, the adhesives can breakdown over time, thereby causing the sleeve to become dislodged from its desired protective position about the sensor. As a result, while in its initially bonded position, this method does not allow for easy removal of the sleeve for servicing of the sensor or reuse of the sleeve, as it requires destroying the bond joint of the adhesive. In addition, tape and interference fits can be unreliable in view of the heat and vibration encountered within the engine compartment, with tapes further being particularly burdensome to apply, and interference friction fits suffering from variances in component tolerances, and difficulty of assembly, particularly if the interference is too great, or if the sleeve needs to traverse increased diameter obstacles along the path of assembly, such as a connector, for example.

A further known mechanism includes the use of an end cap made as a separate component from the tubular sleeve, wherein the end cap is fastened to the sleeve via use of a separate, secondary fastening device, such as staples, tape and/or an adhesive. Although the separate fastening device can prove useful in function, it adds cost and complexity to the assembly as a result of having to maintain and use separate fastening components and processes to apply and fasten the devices, thereby adding complexity and cost to the manufacture and assembly of the insulative sleeve.

SUMMARY OF THE INVENTION

In accordance with one aspect of the invention, a thermal sleeve for protecting an electronic member connected to a wiring harness against exposure to heat is provided. The thermal sleeve has a tubular member including a circumferentially continuous wall with an insulative inner layer bounding an inner cavity extending along a central longitudinal axis between open opposite ends and a reflective outer layer. The sleeve further includes a positioning member constructed of resilient, reflective metal material. The positioning member has a tubular portion and at least one resilient finger extending radially inwardly from the tubular portion for abutment with the wiring harness. The tubular portion is fixedly attached to one of the opposite ends of the wall of the tubular member.

In accordance with another aspect of the invention, the at least one resilient finger extends in a generally conical configuration away from the wall of the tubular member.

In accordance with another aspect of the invention, the at least one resilient finger includes a plurality of resilient fingers.

In accordance with another aspect of the invention, the resilient fingers have side edges that overlap one another.

In accordance with another aspect of the invention, a thermal sleeve in combination with a wiring harness configured in electrical communication with a sensor is provided. The thermal sleeve has a tubular member including a circumferentially continuous wall with an insulative inner layer bounding an inner cavity extending along a central longitudinal axis between open opposite ends and a reflective outer layer. The sleeve further has a positioning member constructed of resilient reflective metal material, wherein the positioning member has a tubular portion and at least one resilient finger extending radially inwardly from the tubular portion for abutment with the wiring harness, with the tubular portion being fixedly attached to one of the opposite ends of the wall of the tubular member.

In accordance with another aspect of the invention, a method of constructing a sleeve for protecting an electronic member connected to a wiring harness against external thermal effects is provided. The method includes providing a tubular member including a circumferentially continuous wall with an insulative inner layer bounding an inner cavity extending along a central longitudinal axis between open opposite ends and a reflective outer layer fixed about the insulative inner layer. Further, providing a positioning member constructed of resilient reflective metal material, wherein the positioning member has a tubular portion and at least one resilient flange extending radially inwardly from the tubular portion for abutment with a wiring harness.

Further yet, fixing the tubular portion of the positioning member to one of the opposite ends of the wall of said tubular member.

In accordance with another aspect of the invention, the method can further include forming the positioning member from a flat piece of metal material and wrapping the flat piece of material into a tubular configuration.

In accordance with another aspect of the invention, the method can further include forming the positioning member from an extruded tubular piece of metal material.

BRIEF DESCRIPTION OF THE DRAWINGS

These and other features and advantages of the present invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
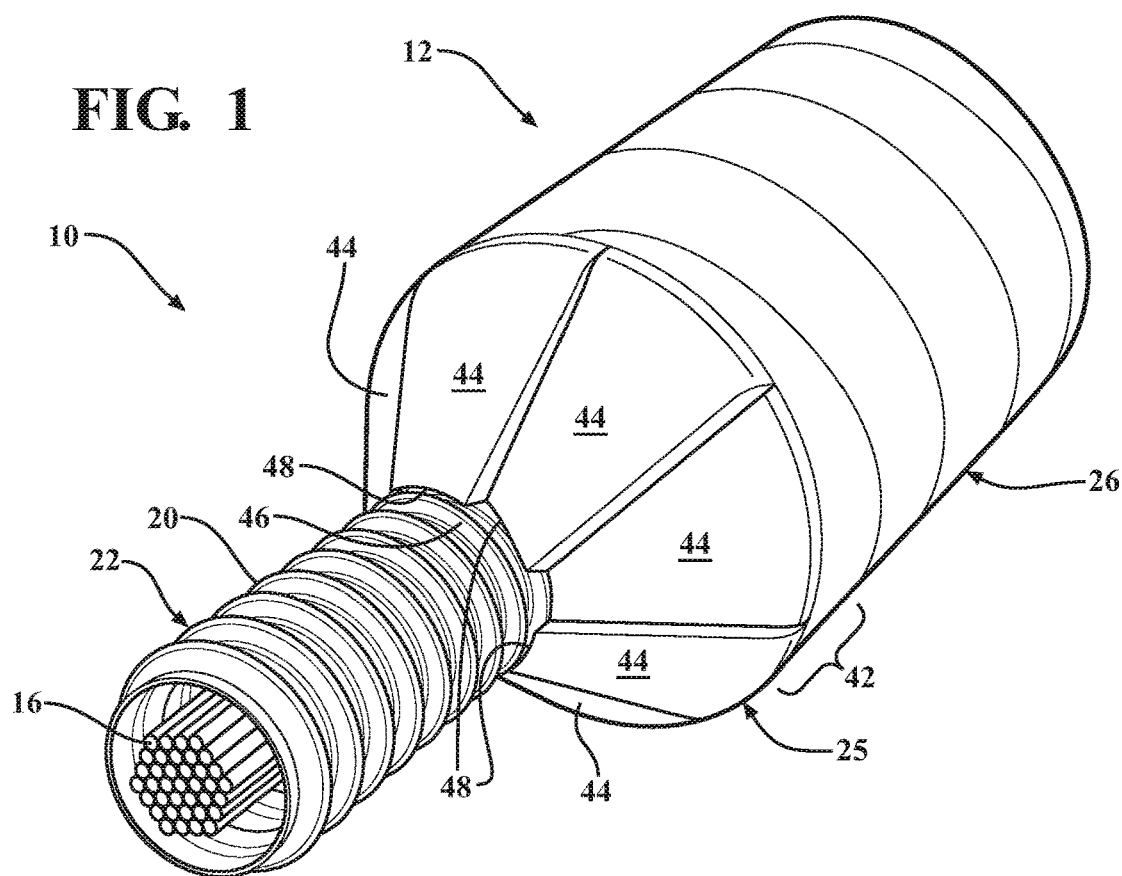
FIG. 1 is a perspective view of a thermal sleeve assembly constructed in accordance with one aspect of the invention for protecting an electrical component shown disposed about a wire harness connected to the electrical component.
Figure 2:
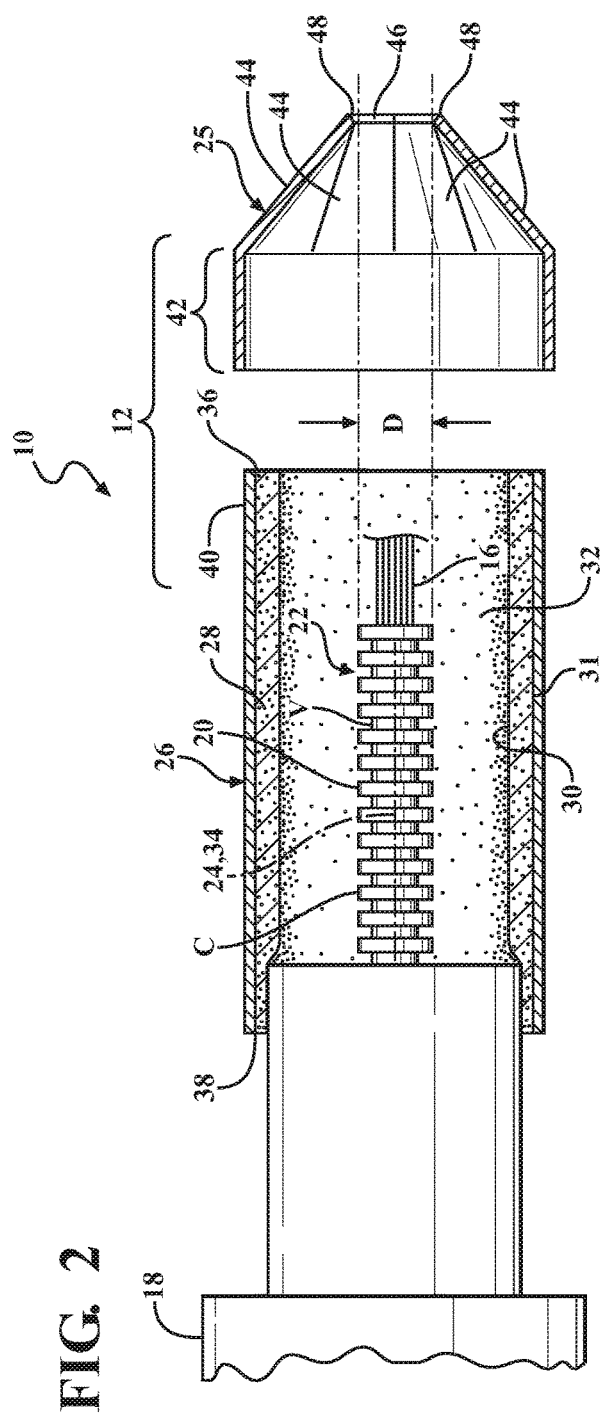
FIG. 2 is a cross-sectional side showing the thermal sleeve assembly of FIG. 1 in a partially exploded state.
Figure 3:
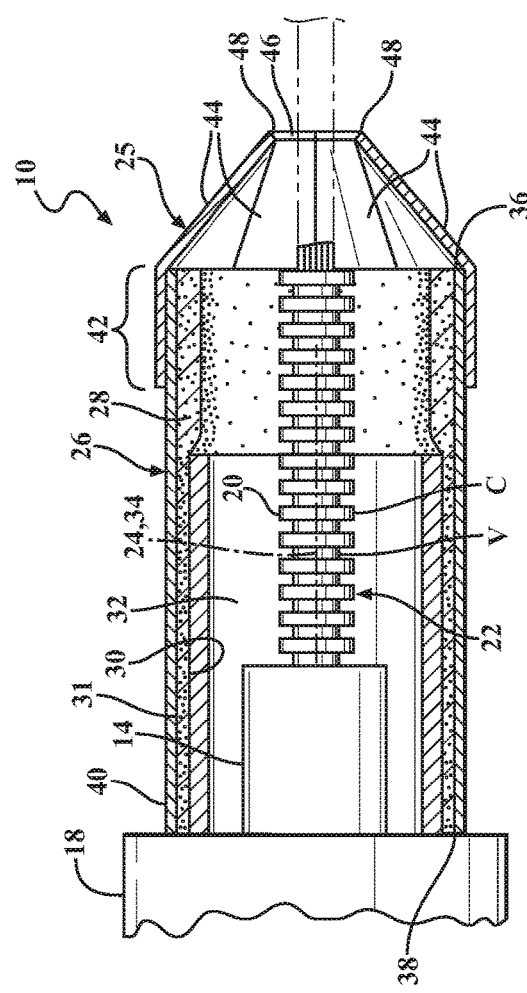
FIG. 3 is a view similar to FIG. 2 showing the thermal sleeve assembly in an assembled state.

Referring in more detail to the drawings, FIGS. 1-3 show an assembly 10 and constructed in accordance with one embodiment of the invention. The assembly 10 include a thermal sleeve 12 with self-retaining positioning member 25 for protecting an electrical member 14, such as sensor contained at least in part within the sleeve 12, against the effects of extreme radiant heat, abrasion, contamination and vibration. The sensor 14 is shown as being connected to an end of a wire harness 16 on an engine component 18 of a vehicle (FIGS. 2 and 3). The wire harness 16 can be provided as a bundle of exposed, insulated wires or as a bundle of insulated wires enclosed within an outer protective sleeve, also referred to as tube 20, such as a tube having a generally smooth or convolute outer surface 22, by way of example and without limitation. The sleeve 12 is configured for a clearance fit and slidable movement along a longitudinal axis 24 of the wire harness 16 and tube 20, if provided, to bring the sleeve 12 into its desired protective position about the sensor 14. The sleeve 12 is configured, via the reflective positioning member 25, which is fixedly attached to the sleeve 12, as discussed in further detail below, to remain fixed in the protective position until desired to selectively slide the sleeve 12 away from its protective position, such as may be desired to service the sensor 14.

The sleeve 12 remains in its protective position during use, without need of secondary fasteners, such as tape or adhesives, and thus, assembly 10 is made simple, aesthetically pleasing, and economical in manufacture and use.

The sleeve 12 can be constructed having any desired length. The sleeve 12 has a tubular member 26 including a circumferentially continuous inner wall 28 with an inner surface 30 and an outer surface 31, with the inner surface 30 bounding an inner cavity 32 and extending along a central longitudinal axis 34 between open opposite ends 36, 38. The tubular member 26 further includes a reflective outer surface 40 on the outer surface 31. The inner wall 28, in accordance with one aspect of the invention, can be constructed of a intertwined fibrous nonwoven material, woven material, knit material, or braided material, and can be constructed having any desired wall thicknesses, depending on the nature and severity of heat exposure in the intended environment.

The reflective outer surface 40 is provided to reflect extreme radiant heat typical of an engine compartment, including temperatures generated by an exhaust system. The outer layer 40 can be formed of any suitable metal material, including a foil layer of aluminum or other desired metals. The foil outer layer 40 is relatively thin, thereby allowing the sleeve 12 to remain flexible over meandering paths and corners. The outer layer 40 can be spiral wrapped or cigarette wrapped about the inner wall 28, as desired. Any suitable, heat resistant adhesive can be used to facilitate bonding the outer layer 40 to the outer surface 31 of the inner wall 28, if desired.

The reflective positioning member, referred hereafter simply as positioning member 25, is constructed of a separate piece of material from the tubular member 26, such as from a resilient, reflective metal material, including aluminum, or spring steel, for example, between about 8-12 mils thick. The positioning member 25 can be provided solely from the single piece of metal material, and thus, does not require addition materials fixed thereto in order to perform it retention and shielding functions. The positioning member 25 has a generally cylindrical, tubular portion 42 and at least one flexible, resilient flange, also referred to as finger 44, and shown as a plurality of fingers 44 extending radially inwardly in oblique relation from the tubular portion 42 and the wall 28 for retaining abutment with the wiring harness 16, or the tube 20 of the wiring harness, if provided. The tubular portion 42 is shown as being generally cylindrical and sized for close, relatively snug receipt about an outer surface of the open end 36 of the tubular member 26, whereupon any suitable fastening mechanism, including mechanical fastener, such as staples, or an adhesive, such as a high temperature resistant adhesive, can be used to fix the positioning member 25 to the tubular member 26. It is contemplated herein that the tubular portion 42 could be sized for close, snug receipt inside the inner wall 28, if desired.

The finger or fingers 44, referred to hereafter in the plural, by way of example and without limitation, of the positioning member are formed to extend radially inwardly in oblique relation from the tubular portion 42 for close, abutting receipt about the wire harness 16, and tube 20 thereof, if provided, to take on a generally frustroconical shape. The fingers 44 are flexibly resilient in spring-link fashion, such that the fingers allow the wire harness 16 and tube 20 to pass freely through an opening 46 formed by an inner periphery of free ends 48 of the fingers 44, whereupon the resiliency of the fingers 44 causes the fingers 44 to remain in springy abutment with the wire harness or tube 20. By remaining in spring-biased abutment with the wire harness 16 or tube 20 thereof, the positioning member 25, and thus, the tubular member 26 are fixed in the desired assembled position relative to the wiring harness 16 and tube 20. If desired to service the electrical member 14, the fingers 44 can be manually lifted away from contact with the wire harness or tube 20, and then the sleeve 12 can be slid in a direction away from the electrical member 14 to allow access thereto. The thickness of the material forming the positioning member 25 is important in that if it were too thin the fingers would not possess the necessary spring-like resiliency to remain in springy, frictional engagement with the wire harness or tube 20, and if it were too thick, it would add excess weight and adversely affect manufacture, as well as making the fingers 44 too stiff.

Figure 4:
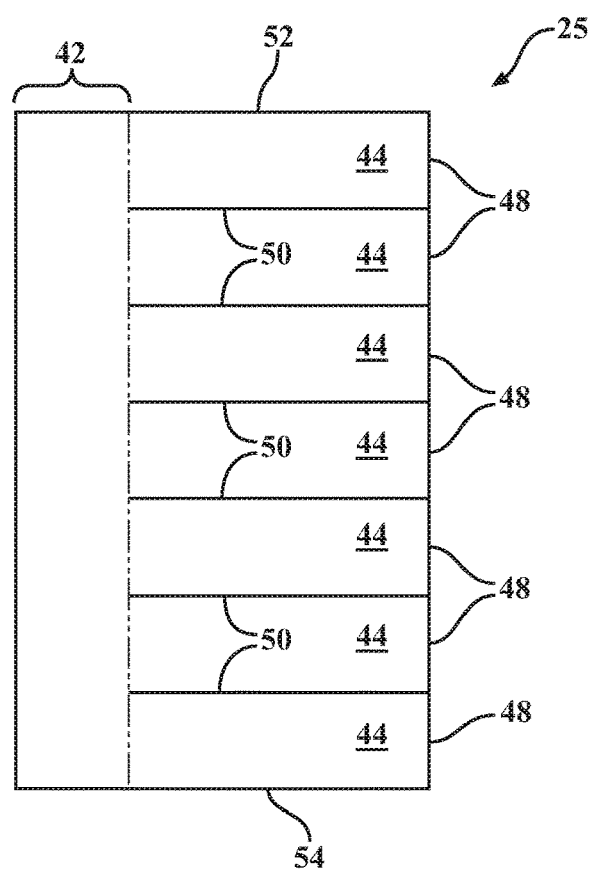
FIG. 4 is a plan view of a position member of the protective sleeve assembly of FIG. 1 shown in a partially constructed state.
Figure 5:
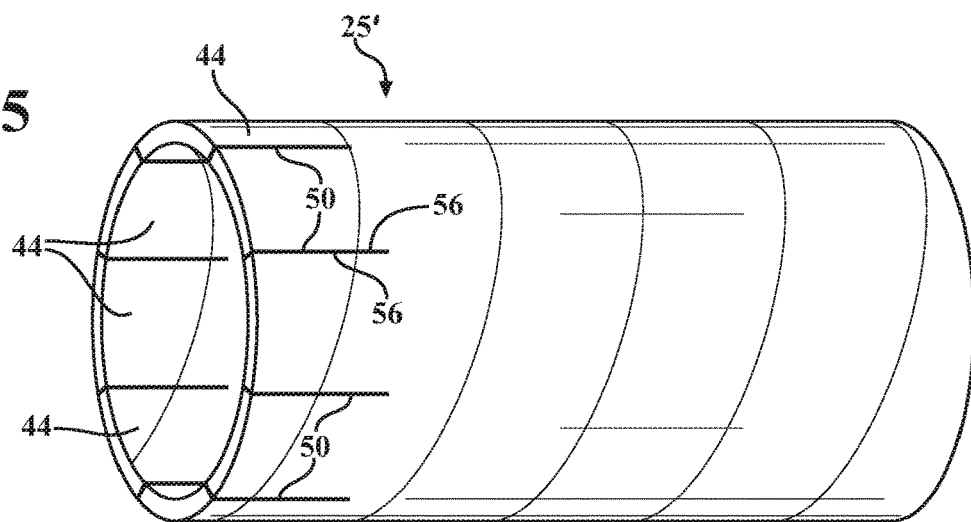
FIG. 5 is an isometric view of a position member constructed in accordance with another aspect of the invention of the protective sleeve assembly of FIG. 1 shown in a partially constructed state.
Figure 6:
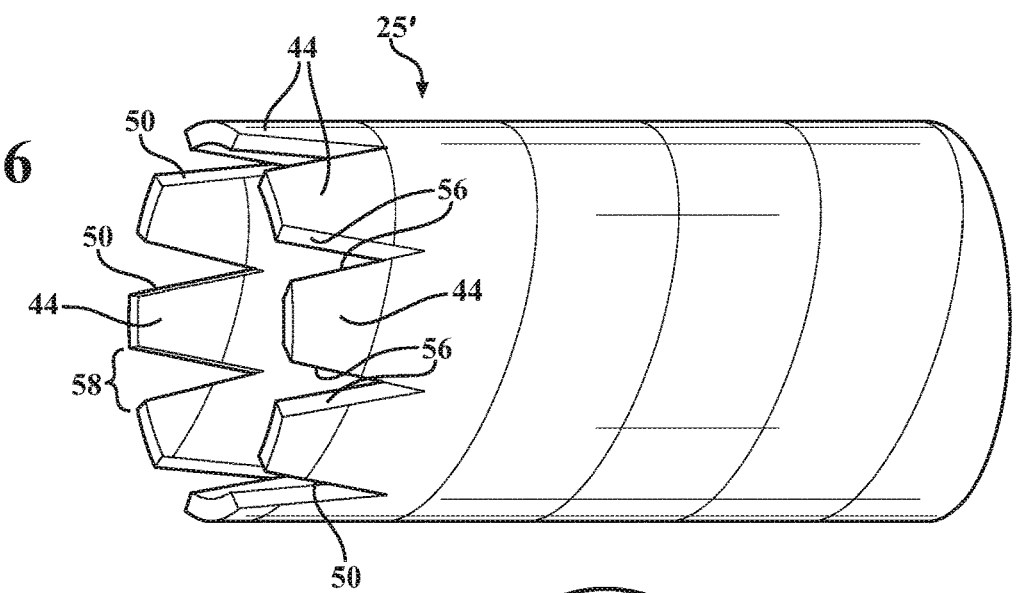
FIG. 6 is an isometric view of a position member constructed in accordance with yet another aspect of the invention of the protective sleeve assembly of FIG. 1 shown in a partially constructed state.
Figure 7:
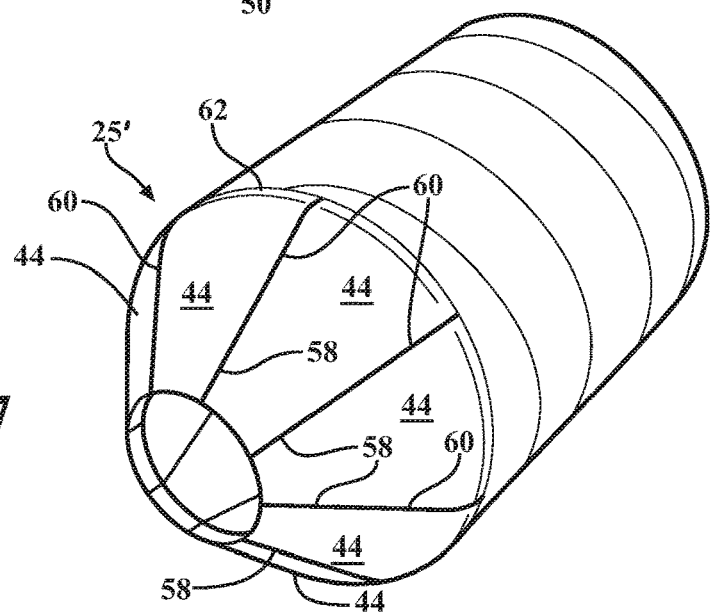
FIG. 7 is an isometric view of the position member of FIG. 6 shown in a fully constructed state.

In use, the sleeve 12 can be easily slid over the wire harness 16 or tube 20, whereupon free ends 48 of the fingers 44 engage and flex radially and axially against the wires harness 16 or tube 20. A predetermined amount of friction and interference between the finger ends 48 and the wire harness 16 or tube 20 can be provided by controlling the spring rate of the fingers 44, such as by selecting the desired thickness of the metal material used to form the positioning member and by controlling the shape and configuration of the fingers 44. Prior to disposing the positioning member 25 about the wire harness 16 or tube 20, the opening 46 formed by the free ends 48 of the fingers 44 is smaller than the largest effective diameter D of the wire harness 16 or tube 20, thereby causing the fingers 44 to be forcibly biased at least slightly radially outwardly when brought into engagement with the wire harness 16 or tube 20. As such, a friction fit is established between the radially inwardly extending, biased fingers 44 and wire harness 16 or tube 20. The shape of the fingers 44 is preferably provided via lengthwise extending slits 50 formed in the material of the positioning member 25, such as in a flat metal strip (FIG. 4) that is cut to the appropriated rectangular size, cut to form the slits 50 to form the individual fingers 44, and then cigarette wrapped into tubular form to bring opposite edges 52, 54 into abutting or slightly overlapping relation, and then fixed in tubular form, such as via any suitable mechanical fastener, e.g. rivet, staple, and/or adhesive. It is further contemplated herein that the positioning member 25' could be formed from an extruded metal tube that is cut to length, slit (FIG. 5A), and then folded to look similar or the same as that of FIG. 1. As shown, the slits 50 extend generally parallel to the central axis 34, and thus, the fingers 44 are generally rectangular in shape. As such, upon bending the fingers 44 into the finished frustroconical configuration, such as shown in FIGS. 1-3, lengthwise extending edges 56 of the fingers 44 overlap one another at least slightly, thereby providing a good barrier against the possible ingress of debris and heat. It is contemplated herein that the slits 50 could be formed otherwise, thereby resulting in differently shaped fingers other than rectangular, such as trapezoidal shaped fingers 44, as shown in FIG. 6, wherein the slits 50 could form triangular or trapezoidal cut out regions 58, thereby resulting in the fingers 44 having a reduced or no overlap with one another, such that the lengthwise extending edges 56 of the fingers 44 form or substantially form a butt joint 60 (FIG. 7) with one another upon being bent radially inwardly. It is to be recognized that the slits 50 can be formed in the flat metal strip of FIG. 4 as shown in FIG. 6, thereby resulting in the fingers 44 being ultimately formed as shown in FIG. 7.

If the tube 20 is provided as a corrugated tube, the fingers 44 can be biased to flex axially over annular crests C during installation and removal, and can be constructed to take on a predetermined thickness to be at least partially received within annular valleys V of the corrugations to facilitate maintaining the sleeve 12 in its intended "in use" position about the sensor 14. During installing, the fingers 44 are caused to be automatically biased radially outwardly against the natural spring bias of the bent fingers 44, with the fingers 44 remaining in frictional engagement with an outer surface of the wires 16 or tube 20 as a result of the spring bias imparted by a fold region 62, thereby causing the fingers 44 to take on a generally conical shape. With the fingers 44 being shiny and reflective, the external radiant heat is reflected away from the cavity 32, thereby protecting the electrical member 14 from exposure to the radiant heat.

Obviously, in light of the above teachings, many modifications and variations of the present invention are possible. It is, therefore, to be understood that within the scope of the appended claims, the invention may be practiced otherwise than as specifically described.

What is claimed is:

1. A method of constructing a sleeve for protecting an electronic member connected to a wiring harness against exposure to heat, comprising:
   providing a tubular member including a circumferentially continuous wall with an insulative inner layer bounding an inner cavity extending along a central longitudinal axis between open opposite ends and a reflective outer layer;
   providing a positioning member constructed of a resilient reflective metal material, the positioning member having a tubular portion and at least one resilient finger extending radially inwardly from the tubular portion for abutment with a wiring harness;
   fixing the tubular portion of the positioning member to one of the opposite ends of the wall of said tubular member; and
   further including providing the at least one resilient finger extending in oblique relation from said wall of said tubular member, such that said at least one resilient finger deflects radially outwardly while installing the sleeve in a first axial assembly direction over the wiring harness and resist flexing radially outwardly to prevent removal of the sleeve in a second axial disassembly direction absent manually lifting said at least one resilient finger radially outwardly from the wiring harness.

2. The method of claim 1, further including providing the at least one resilient finger as a plurality of resilient fingers.

3. The method of claim 2, further including providing the plurality of resilient fingers having lengthwise extending edges overlapping one another.

4. The method of claim 1, further including providing the positioning member having opposite edges wrapped into overlapping relation with one another.

5. The method of claim 1, further including providing the positioning member as an extruded tube of metal.

\* \* \* \* \*